Oct. 28, 1941.     G. K. McKEE     2,260,327
MACHINE TOOL
Filed Aug. 31, 1939     7 Sheets-Sheet 1

INVENTOR.
GEORGE K. McKEE
BY Joseph A. Rave
ATTORNEY.

Oct. 28, 1941.    G. K. McKEE    2,260,327
MACHINE TOOL
Filed Aug. 31, 1939    7 Sheets-Sheet 2
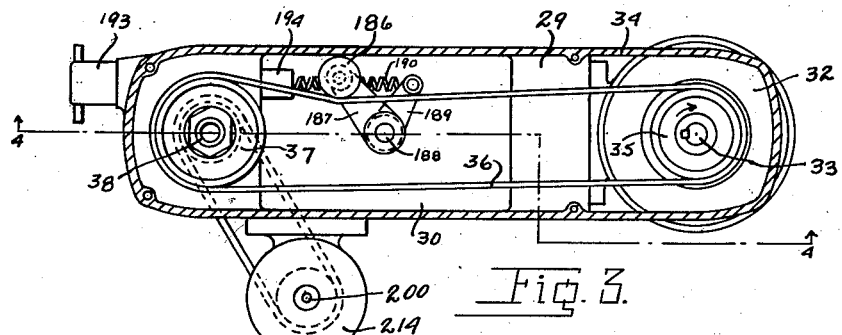
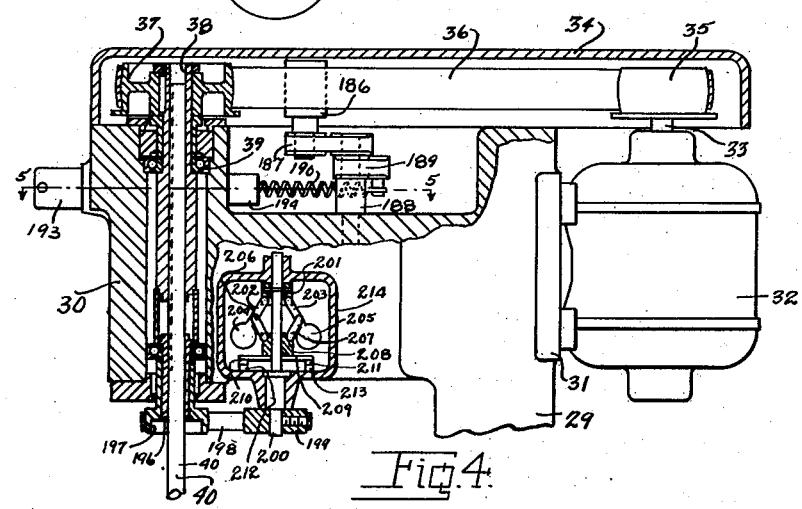
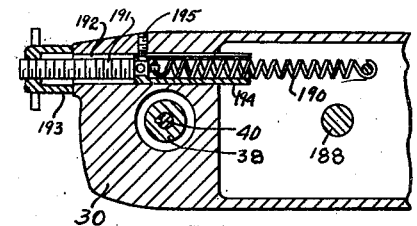
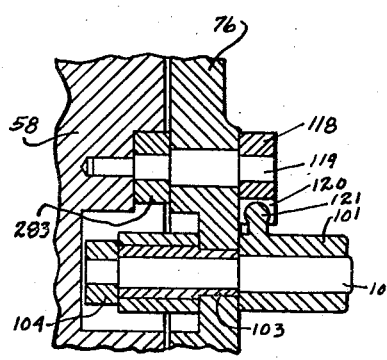
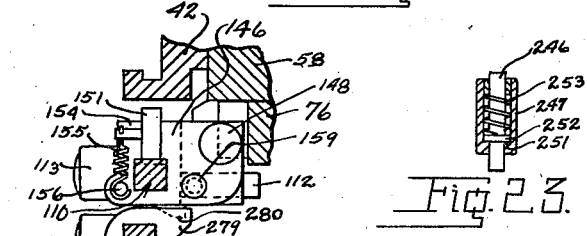
INVENTOR.
GEORGE K. McKEE
BY Joseph A. Rave
ATTORNEY.

Oct. 28, 1941.  G. K. McKEE  2,260,327
MACHINE TOOL
Filed Aug. 31, 1939   7 Sheets—Sheet 3

INVENTOR.
GEORGE K. McKEE
BY
Joseph A. Rave
ATTORNEY.

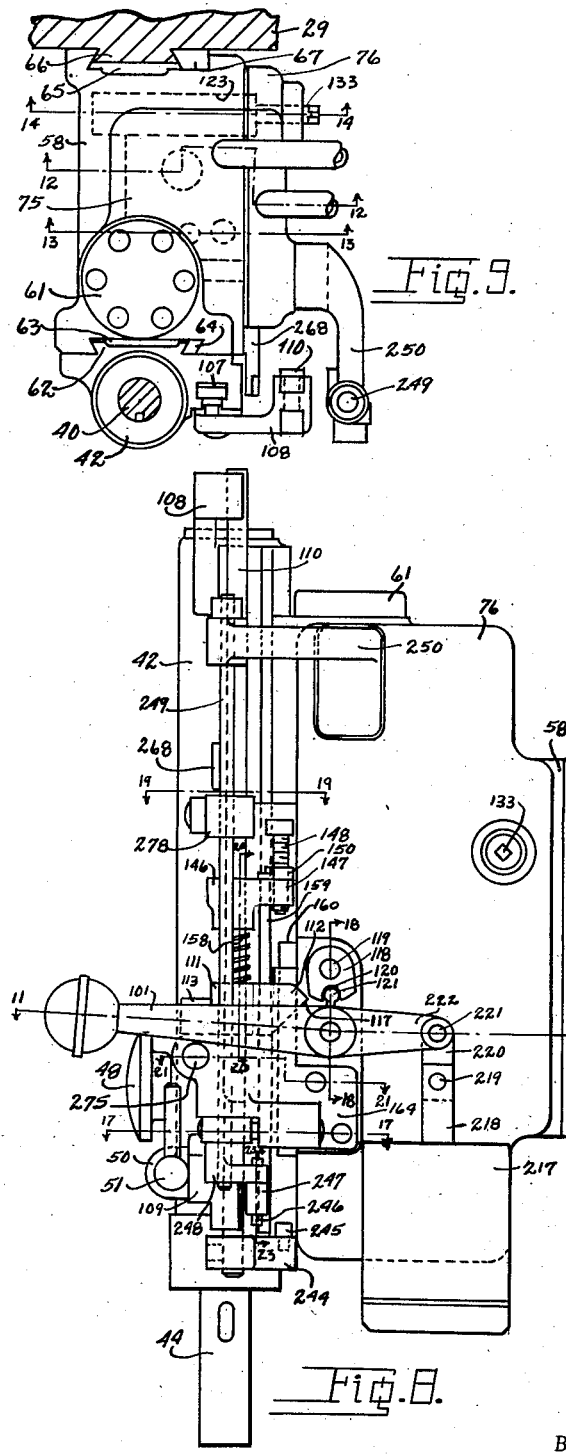

Oct. 28, 1941.                G. K. McKEE                  2,260,327
                              MACHINE TOOL
               Filed Aug. 31, 1939           7 Sheets—Sheet 5

INVENTOR.
GEORGE K. McKEE
BY Joseph A. Rave
ATTORNEY.

Oct. 28, 1941.  G. K. McKEE  2,260,327
MACHINE TOOL
Filed Aug. 31, 1939  7 Sheets-Sheet 6

INVENTOR.
GEORGE K. McKEE
BY
Joseph A. Pave
ATTORNEY.

Patented Oct. 28, 1941

2,260,327

UNITED STATES PATENT OFFICE 2,260,327

MACHINE TOOL

George K. McKee, Cincinnati, Ohio, assignor to The Avey Drilling Machine Company, Covington, Ky., a corporation of Ohio Application August 31, 1939, Serial No. 292,850

19 Claims. (Cl. 77—32)

This invention relates to improvements in machine tools, and particularly to improvements in drilling machines and the control therefor.

In drilling machines, particularly those for drilling long holes, such for example as the oil holes for the bearings of crank shafts as used in internal combustion engines and the like, it is necessary to periodically clean the hole of chips to prevent binding of the drill, as well as cool the drill. In the past, this periodic withdrawal of the drill from the hole for chip clearance and drill cooling has been effected at comparatively close intervals, that is, after each fraction of an inch of drilling or after each given comparatively short time. It has been found that such a mechanism frequently consumes more time than is absolutely necessary, that is, the drilling time is generally too short, resulting in a loss of time. Frequently, however, by increasing this drilling time, trouble is encountered in that hard spots are here and there encountered which causes the drill to stick, and, when drilling at the rate of feed, results in broken drills.

A mechanism operating in accordance with the above is disclosed in the pending application of George K. McKee and Charles E. Bernitt, Serial No. 112,724, filed November 25, 1936, for Machine tools, now United States Patent No. 2,183,297, and on which the mechanism of this application is an improvement. The present mechanism contemplates the provision of control means which will withdraw the drill from the hole in the event of sticking or undue resistance to drill movement, and at the same time effect this withdrawal at definite intervals for chip clearance and the like. By the mechanism of this invention, the heretofore known advantages of a step or deep hole drilling machine are retained without the unnecessary loss of time due to unnecessarily frequent withdrawals of the tool from the work, thereby cutting down on the idle times of machine as heretofore used.

It is therefore an object of this invention to provide a deep hole or step drilling machine which will withdraw the tool or drill from the hole at definite intervals or steps, and at the same time withdraw the drill when the pressure thereon becomes excessive.

It is another object of the present invention to provide a drilling machine of the class above referred to in which the torque or resistance to rotation of the drill due to interference in its feed causes its withdrawal.

It is a still further object of this invention to provide a drilling machine of the class above referred to in which the torque on the drill governs the length of feed stroke of the drill, and when such torque exceeds a safe limit, causes a withdrawal of the drill.

It is also an object of this invention to provide a machine tool or drilling machine to accomplish the above objects, which is economical to manufacture and comparatively simple in its operation.

Other objects and advantages of the present invention should be readily apparent by reference to the following specification considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 3 is a horizontal, sectional view through the spindle drive taken on line 3—3 on Fig. 2.

Fig. 4 is an enlarged view of the spindle drive, partly in section and partly in elevation, as seen from line 4—4 on Fig. 3.

Fig. 5 is a sectional view taken on line 5—5 of Fig. 4.

Fig. 8 is an enlarged side elevational view of the tooling head.

Fig. 9 is a top plan view of the tooling head as illustrated in Fig. 8.

Fig. 10 is an enlarged vertical sectional view through the spindle carrier and its feed mechanism, taken on line 10—10 on Fig. 1.

Fig. 18 is an enlarged, fragmentary, vertical, sectional view through parts of the drilling head, as seen from line 18—18 on Fig. 8.

Fig. 19 is an enlarged, fragmentary view illustrating certain of the control dogs, partly in section and partly in elevation, as seen on line 19—19 on Fig. 8.

Fig. 23 is an enlarged, sectional view through a valve shifting part, as seen from line 23—23 on Fig. 8.

Throughout the several views of the drawings, similar reference characters are employed to denote the same or similar parts.

Figure 1:
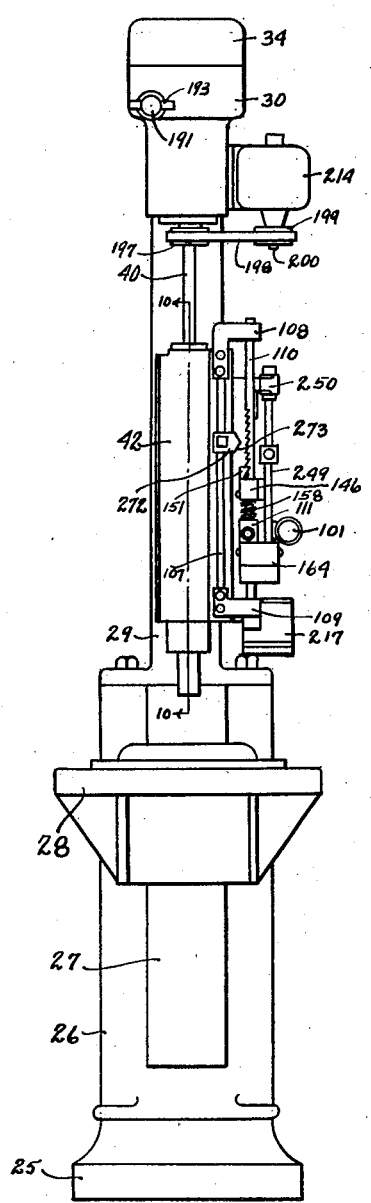
Fig. 1 is a front elevation of a drilling machine embodying the improvements of this invention.
Figure 2:
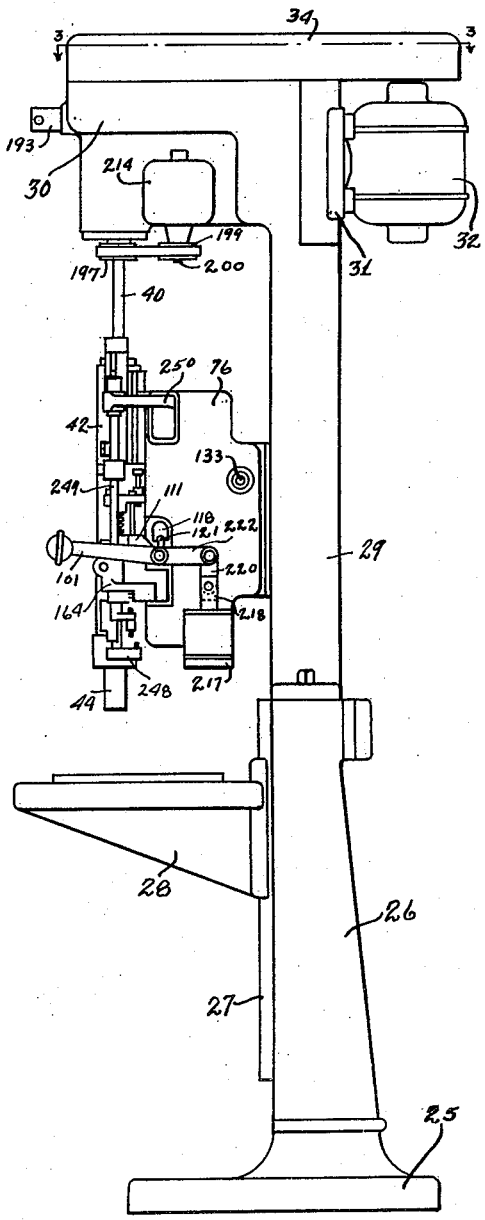
Fig. 2 is a side elevation of the improved drilling machine as seen from the right hand side of Fig. 1.

As was noted above, this invention pertains primarily to controlling a drill for performing step or deep hole drilling operations, that is, a machine in which the tool or drill is advanced at a rapid rate to the work, fed at a slow rate through a part of the work and then retracted, followed by a rapid advance of the drill or tool to the point where it was previously withdrawn for a second short drilling step whereupon reversal again takes place. This cycle of operation is repeated until the work is completely tooled or drilled. As was noted above, the purpose of this type of a control mechanism is to permit the clearing of chips from the holes so that they do not interfere with the rotation or operation of the drill or tool cooling. In the case of drilling oil holes in crank shafts, this is very essential since such drills are of comparatively small diameter and will not stand a great amount of strain. In this instance, the chips interfere with the rotation of the drill, thereby setting up a torque on the drill in excess to that which it will stand, causing said drills to be twisted and broken.

By the present invention, means are provided whereby this torque is utilized for effecting the withdrawal of the drill from the hole. At the same time, these chips may not increase the torque on the drill but might interfere with the proper operation of the drill, thereby causing same to become excessively hot, and means are therefore provided supplementary to the torque control means for periodically withdrawing the drill from the hole to provide for cooling of the drill.

The machine disclosed in the drawings is a single spindle machine, that is, a machine for drilling one hole at a time. It should be noted, however, that a multiple machine may, and in fact has been, produced in which a plurality of drilling heads were employed, thereby simultaneously drilling a comparatively large number of holes, such as the oil holes for all of the bearings of a crank shaft as used in a multiple cylinder internal combustion engine.

Specifically, the machine shown in the drawings comprises a base 25, from which rises a standard 26 having formed vertically of its front face a dovetail guide 27 having a work supporting table 28. Any suitable means (not shown) may be provided for adjusting the work table 28 relative to the guide 27 and for clamping the table in position. Mounted on the upper end of the standard 26 is a column 29 terminating at its upper end in a housing 30 for the spindle bearings and like mechanism.

The column 29, at its upper rear end, is provided with a pad 31 to which is secured a motor 32. Projecting from the motor 32 is the motor shaft 33 which projects into a hollow cover cap 34 secured to the housing 30. The motor shaft 33 has keyed or otherwise secured to it a pulley 35 for a belt 36. The belt 36 is in turn extended around the spindle pulley 37, keyed or otherwise secured to a driving sleeve 38. The sleeve 38 is journaled in an anti-friction bearing 39 and is provided interiorly thereof with suitable driving keys mounted in splines in a spindle 40.

The spindle 40 is mounted for rotation at its lower end in a quill 41, disposed for axial adjustment in a bore in a tool carrier 42. The upper end of the tool carrier 41 carries an anti-friction bearing 43 for the spindle 40. The lower extremity of the spindle 40 is provided with the usual chuck 44 for the drill or other tool.

The spindle 40 is axially adjustable relative to the carrier 42 by means of a rack pinion 45 carried by a shaft 46 rotatably journaled in the carrier 42. The rack pinion 45 meshes with a rack 47 formed integral with or secured to the quill 41. In order to rotate the pinion 45, its shaft 46 projects beyond the forward side of the carrier 42 and has secured thereto a knob or the like 48. The lower end of the carrier is split, and on each side thereof are lugs or ears 49 and 50, respectively provided with a tapped and a plane perforation receiving a clamping stud 51. This clamping stud draws the portions of the carrier on each side of the split 52 toward one another and thereby clamps the quill in adjusted positions.

The spindle carrier, and therefore the parts carried thereby, are actuated by hydraulic means toward and from the work, which means, as shown in Fig. 10, comprises a rearwardly projecting lug 53 on the carrier 42 and having a perforation therein receiving the lower reduced end 54 of a piston rod 55. The piston rod 55 has secured to its upper end a piston 56 movable through a cylinder 57 secured in a bore in the tool head 58.

In order to prevent loss of fluid and pressure around the piston rod at its lower end, use is made of a suitable packed joint 59 carried by the lower cylinder head 60. The upper end of the cylinder 57 is likewise suitably closed by a head 61.

The spindle carrier 42 is guided in its movement relative to the tool head 58 by means of a dove-tailed guide 62 received in a correspondingly shaped guide-way 63 with a gib 64 between one side of the guide and the guide-way. The tool head 58 is provided in its rear side with a dove-tailed guide-way 65 receiving a correspondingly shaped guide 66 formed on the forward face of the column 29. A gib 67 is disposed in the guide-way 65 between one side of the guide tongue 66 and the guide-way 65 for clamping the head in position on the said column 29.

Figure 24:
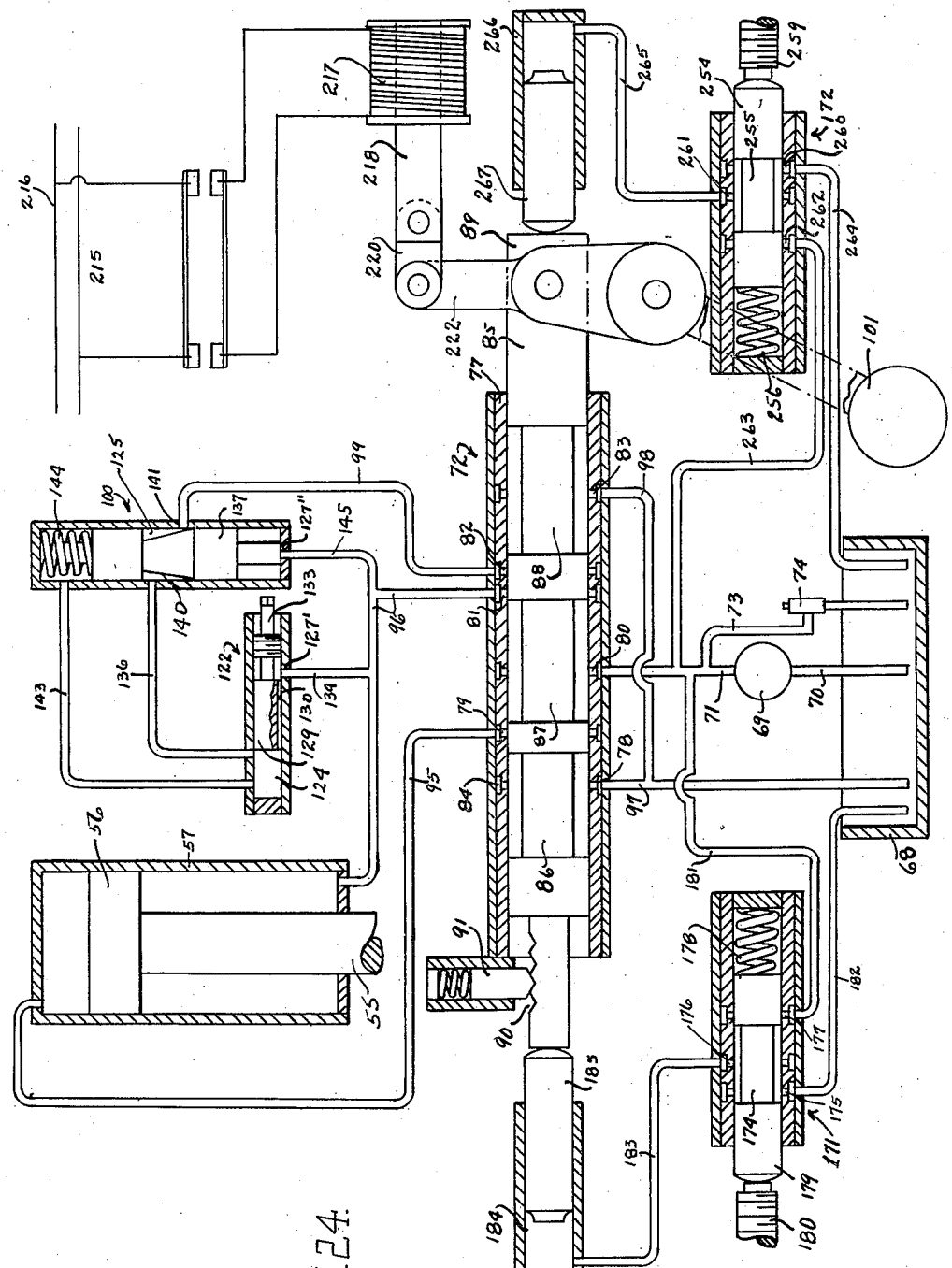
Fig. 24 is a diagrammatic view, depicting the complete hydraulic and electrical circuits utilized in effecting and controlling the movements of the drill or tool carrier.

As was noted above, hydraulic or fluid means is preferably employed for actuating the piston 56, and therefore the spindle carrier, toward and from the work. This hydraulic mechanism is shown diagrammatically in Fig. 24 to which reference is now to be had, and the various valve and control means will be described in detail with reference to their structural illustrations in their other drawings as they are encountered in a complete cycle of operation of the machine. As shown in Fig. 24, use is made of a tank or sump 68, which may be independent of the machine though preferably is formed in some part of the bed, such as the base 25 and lower portion of the stand 26. Mounted above the tank or sump 68 is a constantly rotating pressure circulating pump 69 having its intake or suction side connected by a pipe 70 with the sump or tank. The discharge side of the pump has extending therefrom the pressure pipe or conduit 71, terminating in the main control mechanism indicated in general in Fig. 24 by the reference numeral 72. The pressure pipe or conduit 71 has connected therewith a branch pipe or conduit 73 which terminates in the sump or tank 68, and has intermediate its ends an adjustable relief valve 74. The relief valve 74 determines the actuating pressure in the system.

Figure 12:
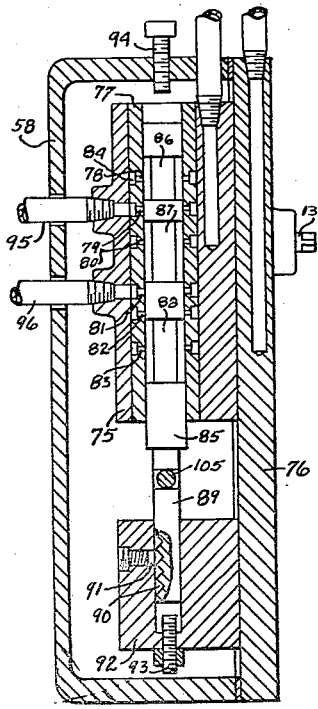
Fig. 12 is a vertical sectional view through the tool head and illustrating the main control valve, taken on line 12—12 on Fig. 9.

The main control valve 72, structurally illustrated in Fig. 12, comprises a valve block 75 secured to the inner face of a plate 76 which closes the open right hand end of the tool head 58, as seen in Fig. 1. Pressed into a suitable bore in the valve block 75 is a valve sleeve 77 having formed therethrough a plurality of sets of radial ports 78, 79, 80, 81, 82 and 83, each set of ports being encircled by a similar groove 84 formed in the exterior of the sleeve 77. Disposed in the bore of the valve sleeve 77 is a spool type valve member 85 provided with reduced portions or cannelures 86, 87 and 88 adapted in different positions of adjustment to connect the several sets of ports in the valve sleeve 77.

The valve 85 has four operative positions, and in order to determine these positions, it has projecting therefrom a stem 89 provided with V-shaped notches 90 co-operating with a spring pressed detent 91 carried by a valve block 92. The valve block 92, similar to the valve block 75, is secured to the inner face of the plate 76, and therefore projects into the interior of the tool head 58. The position of the valve illustrated in the drawings is the neutral or stop position, and the valve has a position to the right of that shown in Fig. 24, or below that shown in Fig. 12, which is the retracting position. In order to limit the movement of the valve to the right in Fig. 24, and downwardly in Fig. 12, use is made of a stop screw 93 carried by the valve block 92 in alignment with the valve stem 89. A third position of the valve 85 is to the left of that shown in Fig. 24 and upwardly of that shown in Fig. 12, which is the slow feed position to cause the tool to feed slowly through the work while a cut is being effected. The fourth position of the valve is to the extreme left in Fig. 24, and extreme upper position in Fig. 12, which is the rapid downward position to cause a rapid approach of the tool to the work. This fourth position is finally determined by a stop screw 94 threaded into the upper wall of the tool head 58.

As seen in Fig. 24, the radial ports 79 and 81 have respectively connected with them one end of pipes or conduits 95 and 96 which respectively terminate at ports located at upper and lower ends of the piston cylinder 57. The ports 80 have connected therewith the upper end of the main pressure pipe or conduit 71, while the ports 78 and 83 have connected therewith pipes or conduits 97 and 98 which terminate in the sump or tank 68, and are therefore the return lines for the system for the main control valve. The remaining set of ports 82 of the piston sleeve 77 have connected therewith one end of a pipe or conduit 99 which terminates in a balance valve mechanism, indicated in general in Fig. 24 by the reference numeral 100, and which will be described in detail later.

Figure 11:
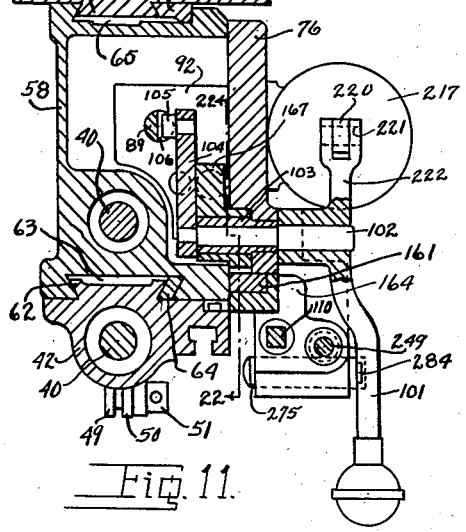
Fig. 11 is a horizontal sectional view through the tooling head, taken on line 11—11 on Fig. 8.

At the commencement of a tooling cycle, the valve 85 is manually shifted by means of a lever 101, see Fig. 11, which is keyed or otherwise secured to the outer projecting end of a shaft 102 oscillatably journaled in a bushing 103 carried by the tool head cover plate 76. The inner projecting end of the shaft 102 has keyed or otherwise secured to it a lever 104 having at its free end a valve shifting pin 105 received in a slot 106 formed in the valve stem 89. This initial shifting of the valve member 85 is to the extreme left in Fig. 24 and extreme upper position in Fig. 12 for thereby connecting the pressure ports 80 with the ports 79 and causing a flow of fluid from the conduit 71 to the conduit 95, and therefore the upper end of the cylinder 57 for actuating the piston 56 downwardly together with the parts connected therewith. The fluid beneath the piston 56 is at this time being exhausted by way of pipe or conduit 96 to the ports 81 and 83 to the pipes or conduits 98 and 97 to the sump or tank 68. As was noted above, this movement of the piston and parts connected therewith is at a rapid rate in a downward direction or toward the work.

Figure 22:
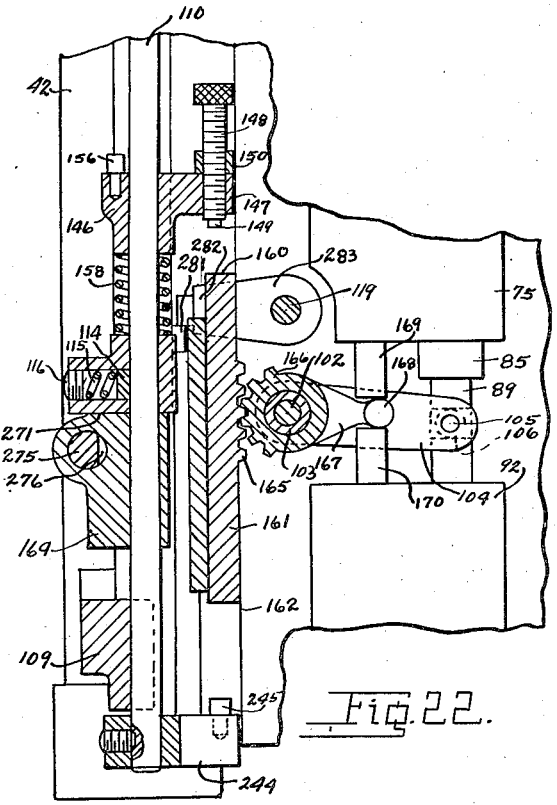
Fig. 22 is an enlarged, sectional view through certain valve operating means, as seen from line 22—22 on Fig. 11.
Figure 17:
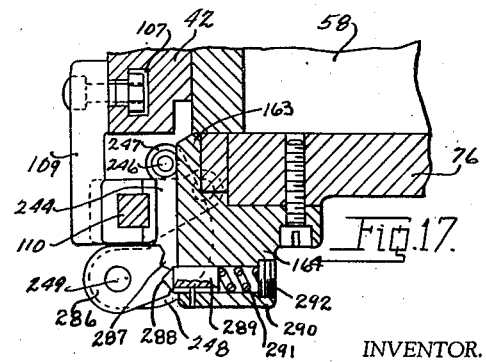
Fig. 17 is an enlarged, horizontal, fragmentary, sectional view through a portion of the drilling head as seen from line 17—17 on Fig. 8.

The rapid downward or advance movement of the carrier continues until the drill or tool is about to strike the work, whereupon this movement is changed to a relatively slow feed rate of movement. In order to accomplish this, the tool carrier 42 is provided therein with a T-shaped slot 107, see Fig. 9, which extends the length of the carrier and has secured therein at its upper end a bracket or arm 108, and at its lower end a bracket or arm 109, see Fig. 17. Carried by the brackets or arms 108 and 109 is a rod or bar 110, shown in the drawings as of angular cross section. Mounted on this rod is the cumulative rapid traverse stop dog 111 which, as seen in Figs. 8 and 22, is provided with a cam shaped nose 112 on one side of the rod 110, and with a circular boss 113 on the other side thereof. The boss 113 is hollow to accommodate a friction shoe 114 backed up by a spring 115 whose tension may be adjusted by screw 116. The cam nose provides an inclined cam face 117 for engagement with a flipper dog 118. The flipper dog 118, as seen in Figs. 8 and 18, is secured to the outer end of a stud 119 oscillatably journaled in the tool head plate 76. The flipper dog 118 is provided with a notch 120 receiving the ball end of a projection 121 extending from the lever 101.

From this, it will be seen that the cumulative rapid traverse stop dog 111 is adjustably positioned on the rod 110 to engage the flipper dog 118 at the point where the drill or tool is about to engage the work. The oscillation of the flipper dog 118 in a counterclockwise direction, as seen in Fig. 8, actuates the lever in a clockwise direction, which, through the shaft or stud 102 and arm 104, shifts the valve member 85 to a position for cutting off the flow of the exhaust fluid through the pipe or conduit 96 and therefore the unrestricted port 81. This flow is directed, instead, from the pipe or conduit 96 to the feed determining valve, indicated in general in Fig. 24 by the reference numeral 122.

Figure 14:
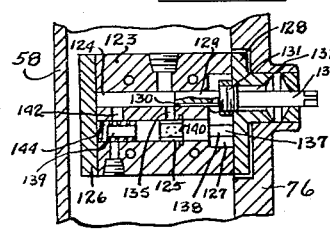
Fig. 14 is a fragmentary sectional view through the feed determining valve, taken on line 14—14 on Fig. 9.

This feed determining valve 122 is shown structurally in Fig. 14, and comprises a valve block 123 secured to the rear side or end of valve block 75, as shown in dotted lines in Fig. 9. The valve block 123 is provided therethrough with a pair of bores 124 and 125, one end of which are closed by a plate 126, while the other ends are in communication with a chamber 127. This chamber 127 is in turn closed by a plate 128 secured to the block 123. Disposed in the valve block bore 124 is a valve member 129 having an inclined groove 130 formed around one side thereof. The valve member is provided adjacent thereto with an enlarged threaded portion 131 threaded into an aperture 132 formed through the closure plate 128. Projecting from the threaded portion 131 is the valve stem 133, having its end provided with a portion to receive a suitable wrench, key or the like whereby the valve may be turned to effect its adjustment through its enlarged threaded portion 131.

The most shallow portion of the groove 130 is adjacent to the chamber 127 and determines the rate of flow from this chamber. From this, it will be seen that the greater the depth of the groove 130, which is in communication with the chamber 127, the faster the flow from this chamber, and that the position of this groove with respect to the chamber 127 is determined by the adjustment of the threaded portion 131 on the valve stem 129 and therefore the rate of flow of the fluid and the rate of feed of the drill or tool. This chamber 127 is shown diagrammatically in Fig. 24 as a port 127' to which is connected one end of a pipe or conduit 134 which has its other end connected with the pipe or conduit 96 from the lower end of the cylinder 57.

The valve block 123 is shown as provided with a port 135 between the valve block bores 124 and 125. This port 135 is diagrammatically illustrated in Fig. 24 as a pipe or conduit 136 connecting the valve bore 124 ahead of the valve member 130 with the bore 125 which contains the balance valve mechanism, indicated in general by the reference numeral 100.

The balance valve mechanism 100 is illustrated structurally in Fig. 14, and comprises a valve member 137 having reduced stem portions 138 and 139 at opposite ends thereof, together with a reduced central portion or cannelure 140. This reduced portion or cannelure controls the flow through a port, shown in Fig. 24 by the reference character 141, with which is connected the pipe or conduit 99. The valve block 123 is shown as having a second port 142 connecting the valve bores 124 and 125, this port being diagrammatically shown as a conduit 143 in Fig. 24, and connects the space ahead of the valve member 129 with the space ahead of the valve member 137. The space ahead of the valve member 137, and including the reduced portion 139, includes a spring 144 which surrounds the said reduced valve portion 139 and abuts against the closure plate 126 for urging the valve member 137 to the right, as seen in Fig. 14, or downwardly as seen in Fig. 24, maintaining the port 141 normally open. As will be seen in Fig. 14, the fluid chamber 127 is at all times in communication with the end of the valve member 137, and this chamber is illustrated in Fig. 24 by means of a port 127" with which is connected one end of a pipe or conduit 145 which has its other end connected with the pipe or conduit 96.

The operation of the balance valve mechanism is well understood, its purpose being to maintain a constant flow of fluid through the system when the tool is being actuated through a slow or feeding cycle. This flow from the exhaust pipe or conduit 96 from the cylinder 57 is by way of the pipes or conduits 134 and 145 to the chamber 127 where it acts on the balance valve 137 for actuating it against the resistance of spring 144 and flowing through the groove 130. The flow through the groove 130 is through the ports 135 and 142 respectively and pipe or conduits 136 and 143. The flow through the port 142 or pipe or conduit 143 combines with the yieldable urge of the spring 134 for shifting the valve against the pressure in chamber 127 and therefore opening the port 141 an amount equal to the balance in pressure at the two ends of the valve as determined by the adjustment of the valve member 129. This flow through the port 141 is into the pipe or conduit 99 to the main control valve mechanism 72 where it is connected with the pipes or conduits 98 and 97 and the sump or tank 68.

The slow feeding movement of the tool continues until the tool carrier is reversed for withdrawing the tool from the work. The reversal of the tool carrier may be accomplished through either of two instrumentalities, either after a definite amount of slow feed has taken place, or when the torque on the drill reaches a point near the safe torque load on the drill. In order to reverse the tool carrier and withdraw the drill from the work after a pre-determined amount of drilling has taken place, the following mechanism is employed.

Figure 20:
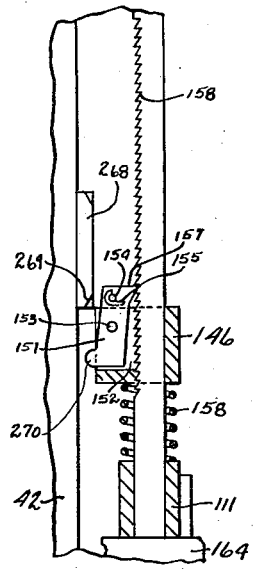
Fig. 20 is an enlarged, fragmentary, vertical, sectional view, partly in section and partly in elevation, as seen from line 20—20 on Fig. 8.

Mounted on the dog rod or bar 110, as seen in Figs. 8, 20 and 22, is a slow feed dog 146 having projecting from one side thereof an arm 147 into which is threaded a dog screw 148 having a nose 149. The dog screw 148 is locked into adjusted position by lock nut 150. The adjustment of the dog screw 148, and the distance between the ends of its nose 149 and the cam nose 112 of the cumulative rapid traverse dog 111, determines the amount of drilling or the amount of slow feed movement imparted to the tool carrier. This feed dog 146 is loosely mounted on the dog rod 110 and is connected thereto by means of a pawl 151 disposed in a slot 152 formed in the dog 146 and pivotly connected by means of pivot 153. The upper end of the pawl 151 has projecting therefrom a pin 154 to which is connected one end of a spring 155 which has its other end connected with a second pin 156 projecting from the dog 146, see Fig. 19. This spring maintains the pointed nose 157 of the pawl 151 in engagement with ratchet teeth 158 formed on the inner face of the dog rod 110. From the foregoing, it will be seen that even though the feed dog 146 is loosely or slidably mounted on the dog rod 110, it is positively and mechanically connected therewith. The feed dog 146 is maintained in definite spaced relation with the cumulative rapid traverse dog by means of a spring 158 disposed around the dog rod 110 and abutting at opposite ends with said dogs. In order to maintain said dogs in spaced relation with one another, use is made of a tie rod or bolt 159 which has its lower end threaded into the rapid traverse dog and its upper end passing through a plane perforation in the said dog with a head at the upper end of the tie rod or bolt 159 engaging the upper surface of feed dog 146.

The nose 149 of the dog screw 148 engages the upper end 160 of a slide 161 adapted to slide against the face 162 of the plate 76 of the tool head 58. The slide 161 is retained in position by a flange 163 projecting from a bracket 164 secured to the head plate 76. This slide 161 is provided intermediate its ends with rack teeth 165 meshing with a segmental gear 166, rotatably mounted on the bushing 103 carried by the tool head plate 76.

The segmental gear 166 has projecting rearwardly therefrom an arm 167 provided at its rear end with a circular head 168 contacting on opposite sides thereof with valve stems 169 and 170. The valve stems 169 and 170 are associated with valve mechanisms which operate pistons for shifting the main control valve member 85, and these valve members are respectively shown diagrammatically in Fig. 24 where they are respectively indicated in general by the reference characters 171 and 172.

Figure 13:
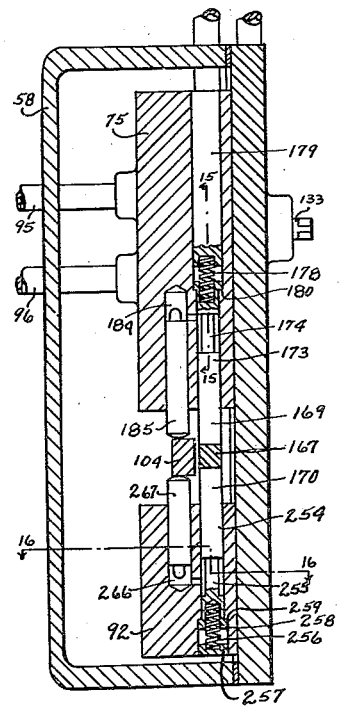
Fig. 13 is a view similar to Fig. 12, taken in a plane ahead of that of Fig. 12 on line 13—13 on Fig. 9.
Figure 15:
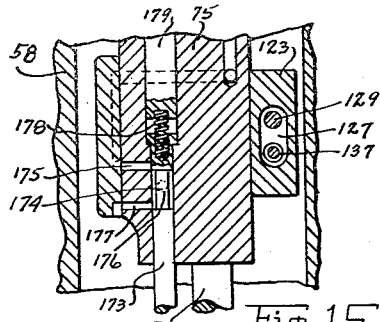
Fig. 15 is a fragmentary sectional view, taken at right angles to Fig. 13, on line 15—15 of said Fig. 13.
Figure 16:
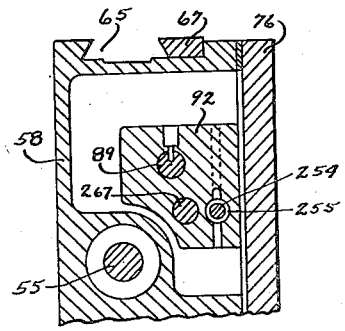
Fig. 16 is a fragmentary, transverse, sectional view, taken on line 16—16 on Fig. 13.

The valve mechanism 171 is illustrated structurally in Figs. 13 and 15 and comprises a valve member 173 integral with the valve stem 169 having a reduced portion or cannelure 174 intermediate the ends thereof. The valve member 173 is mounted in a bore in the valve block 75, which is provided with three ports 175, 176 and 177. The valve member 173 is adapted, when in the position shown, to connect the ports 176 and 177, and when in its second position, to cut off the port 177 and connect the ports 176 and 175. The valve is shifted to the position shown by means of a spring 178 disposed in a counterbore in the upper end of the valve member, having its other end seated in a counterbore in a plug 179 secured in the upper end of the valve bore. It should be noted at this time that the plug 179 is of a slightly greater diameter than the valve member 173, thereby providing a shoulder 180 against which an enlarged collar portion of the valve member 173 engages to limit the movement of the valve member by the spring 178. As seen in Fig. 24, the port 177 has connected therewith one end of a branch pressure pipe or conduit 181 which extends from the main pressure pipe or conduit 71, while the port 175 has connected therewith one end of a drain pipe or conduit 182, which terminates at the sump or tank 68. The remaining port 176 is illustrated in Fig. 24 as a pipe or conduit 183 and terminates in a cylinder 184. This cylinder is illustrated in Fig. 13 as a bore in which is mounted a piston 185 which has its lower end in contact with the upper surface of valve shifting arm 104.

From the foregoing it will now be seen that engagement of the dog screw 148 with the slide 161 causes same to actuate the arm 167 and shift valve 173, thereby connecting pressure in the pressure line 71 through the pipe or conduit 181 and cannelure or reduced portion 174 with the pipe or conduit 183 and cylinder 184, for actuating the valve arm 104 for shifting the main control valve member 85 to its extreme right hand position, as seen in Fig. 24. The shifting of the valve member 85 to its right hand position connects the pressure in the pipe or conduit 71 with the pipe or conduit 96, thereby elevating the piston 56, and parts connected therewith, at a rapid rate. The fluid ahead of the piston 56 is exhausted by way of the pipe or conduit 95, main control valve 85 and pipe or conduit 87 to the sump or tank 68.

The foregoing description deals with a step or deep hole drilling machine, as has been known, that is, with the means for effecting a definite amount of slow feed drilling prior to reversal. With ths type of machine, the dogs are usually set to effectually control a small drilling stroke, that is, around a quarter of an inch for each withdrawal, which means quite a large number of reversals for holes two or more inches in length. As was noted above, the machine of this invention contemplates and includes means whereby this feeding stroke may be materially enlarged, and not dependent on time withdrawals or reversals, but, instead, utilizes the torque on the drill or tool as the governing factor in effecting the withdrawals. One form of the torque control means is illustrated in Figs. 1, 2, 3, 4 and 5 and includes a belt tensioning mechanism having an idler tensioning pulley 186 mounted in the free end of an arm 187 oscillatably journaled on a stud 188 carried by the housing 30. Connected to the arm 187, and likewise oscillatably mounted on the stud 188, is an arm 189 having connected to its free end one end of a spring 190. The other end of the spring 190 is fastened to the inner end of an adjusting screw 191 disposed in a bore 192 in the housing 30. The adjusting screw 191 has threaded on its outer end an adjusting knob or nut 193 which abuts on its inner end against the face of a lug or pad provided on the housing for this purpose. A sheathing and guide sleeve 194 is likewise secured to the inner end of the screw 191, and is prevented from rotation by a dog screw 195.

It will be noted that the idler tensioning pulley 186 is on the driving side of the belt, and not on the slack side, as is usual with idler pulleys. With this construction, the adjustment of the screw 191, and the tensioning of the spring 190, places the desired drive tension on the belt, and thereby the spindle 40 is driven by the drive sleeve 38.

Just below the housing 30, the spindle 40 has splined thereto a short sleeve 196, to which is secured a pulley 197. Encircling the pulley is a belt 198, which, in turn, is disposed around a second pulley 199, pinned or otherwise secured to the lower end of a governor spindle 200. The governor spindle 200 has pinned to its upper end a carrier 201, to which is pivotly connected arms 202 and 203 having their outer ends respectively weighted as by balls 204 and 205. The arms 202 and 203 have respectively pivotly connected therewith, links 206 and 207, respectively having their outer ends connected with a slider 208, mounted on the governor spindle 200. The slider 208 carries contact plate 209 for contacts 210 and 211, which contacts are adapted to engage fixed contacts 212 and 213 when the governor spindle 200 is idle or rotating at a speed below that at which centrifugal force will throw out the balls 204 and 205 and raise the slider 208. The governor spindle 200, and parts carried thereby, with the exception of the pulley 199, are encased in a housing 214, which is suitably secured to the spindle drive housing at a point to one side of the spindle.

As shown in Fig. 24, the movable contacts 210 and 211 have respectively connected therewith the power lines 215 and 216 of an electrical supply, while the fixed contacts 212 and 213 are respectively connected with the opposite ends of the windings of a solenoid 217.

The solenoid 217, as seen in Fig. 8, is secured to the lower end of the tool head plate 76, and has the core 218 projecting therefrom. The upper end of the core 218 is pivotly connected at 219 with a link 220. The upper end of the link 220 is pivotly connected at 221 with an extension 222 of the lever 101.

In the operation of this governor controlled feed stopping mechanism, the tensioning pulley 186 is adjusted to a safe point below the breakage point of a drill or other tool while in operation.

This tension is sufficient to permit the drill or other tool to properly operate when the drive sleeve 38 and spindle 40 are rotating. The rotation of the spindle 40 is imparted by means of the belt 198 to the governor spindle 200, thereby rotating the same and causing the balls 204 and 205, through centrifugal action, to swing out and draw the slider 208 upwardly, thereby breaking the control between the movable contacts 210 and 211 and the fixed contacts 212 and 213, and breaking the electric pull of the solenoid 217. If, during the drilling operation and slow feed of the tool relative to the work, chips or the like are encountered which increase the torque on the drill to a point endangering the safety of the drill, it slows down, thereby causing a slippage of the driving belt 36 relative to the pulley 37, and a decrease in speed of the drive sleeve 38 and spindle 40. This decrease in spindle speed naturally causes the slowing down of the governor spindle 200, and the weighted arms 202 and 203 or the balls 204 and 205 to drop by gravity to their normal idle position, thereby bringing into engagement the contacts 210 and 211 with contacts 212 and 213, completing an electrical circuit to the solenoid 217. The pull of the solenoid 217, on the core 218 through the link 219, actuates the lever 101, and though its connection with the valve member 85 shifts same to its retracting position, which is of course to its extreme right hand position as seen in Fig. 24. As was noted above, this position of the valve member 85 effects the rapid retraction of the spindle carrier and parts carried thereby.

From the foregoing, it will now be appreciated that the tool carrier, and parts carried thereby, may be retracted from their operative position only when necessary, instead of after every quarter inch of drilling, as was the practice in the past. In order, however, to be safe, and clear the hole of loose chips periodically, use may also be made of the feed stop dog 146, which would be set to operate only after each inch or more of hole had been drilled, and thereby again materially cut down on the idle time of machines.

Figure 6:
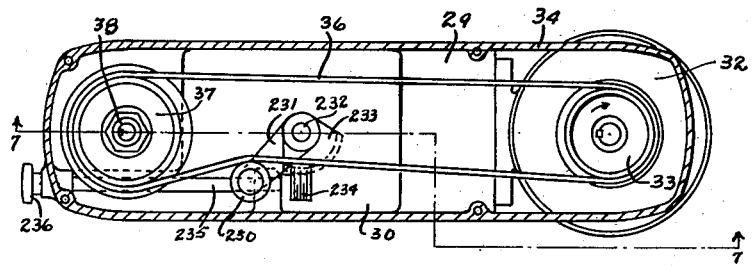
Fig. 6 is a view similar to Fig. 3 showing a slight modification in the spindle drive.
Figure 7:
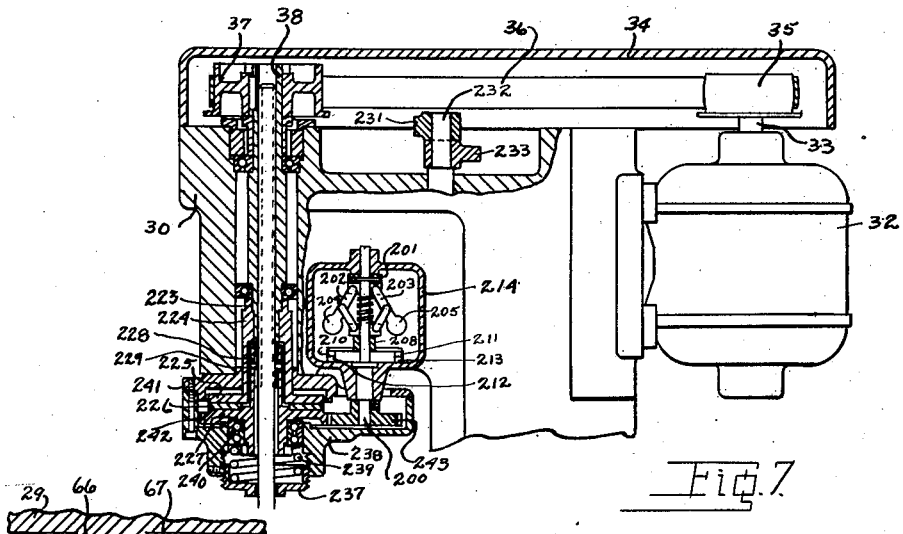
Fig. 7 is a view similar to Fig. 4, partly in elevation and partly in section, as seen from line 7—7 on Fig. 6.

Instead of the direct connection between the spindle and governor by way of the belt 198, above described, use may be made of a friction clutch mechanism, such as, for example, is shown in Figs. 6 and 7. In the construction shown in these figures, the driving sleeve 38 is not keyed or splined to the spindle 40, but, instead, is secured, as by screw threads 223, to a sleeve 224, which carries at its lower end a flange 225. This flange 225 forms a clutch member and contacts with a clutch facing 226, which, in turn, contacts with a second clutch member or flange 227. This second clutch member 227 has a sleeve 228 projecting upwardly therefrom, and is provided at its upper end with keys 229 to enter the splines in the spindle 40. In order words, with the construction just described, the friction clutch 225—227 is, in effect, interposed between the spindle 40 and its driving mechanism, including the pulley 37 and sleeve 38. With this type of construction, it is desired that the tension on the belt be at all times the driving tension, whereby the slack side of the belt 36 has contacting therewith the idler tension pulley or roller 230, rotatably mounted at the free end of an arm 231, oscillatably mounted on a stud 232 carried by the housing 30. Also mounted on the stud 232, and connected with the arm 231, is a segmental gear 233, having its teeth enmesh with a worm 234 on the inner end of a worm shaft 235. The worm shaft 235 is rotatably journaled in suitable bearings provided by the housing 30, and which has secured to its projecting free end a knob 236.

The tension on the friction clutch 225—227 is adjustable by means of a cup-shaped nut 237, threaded into the lower end of a housing member 238. Disposed within the cup is a coiled spring 239 which abuts on its lower end the adjusting nut 237, and on its upper end with an anti-friction thrust bearing 240, which is carried by the friction clutch member 227 and acts through this thrust bearing to force the members into engagement with one another. The housing member 238 cooperates with a second housing member 241 to completely enclose the friction clutch and parts associated therewith, and this housing member is suitably secured to the spindle housing 30 to maintain the parts in operative relation.

The clutch member 227 is provided on its periphery with clutch teeth 242 which mesh with a pinion 243 secured to the governor spindle 200. The governor mechanism operated by the spindle 200 is, in the present instant, identical with that above described, the only difference being that, instead of a pulley 199 on the spindle, pinion 243 is substituted therefor, and since the performance in operation of this governor is identical with that above described, no further description thereof is deemed necessary.

The rapid retraction of the spindle carrier and parts associated therewith continues until the carrier is reversed. The means and mechanism disclosed in the drawings for effecting this reversal includes an arm 244, secured to the lower end of the dog rod 110. The arm 244 has upstanding from its free end an abutment pin 245 adapted to engage the lower end of a pin 246, illustrated most clearly in Figs. 8 and 23. The pin 246 is mounted in a cylindrical portion or housing 247, at the end of an arm 248 pinned or otherwise secured to an oscillatable rod 249. The rod 249 is journaled for oscillation at its upper end in a bracket 250 carried by the tool head plate 76, and is further journaled at its lower end in the bracket 164, likewise carried by the tool head plate 76. As will be seen from Fig. 23, the housing 247 is provided at its lower end with a shoulder 251 on which rests an enlarged collar 252 on the pin 246. A coil spring 253 surrounds the pin 246 and abuts with the collar 252 for maintaining the pin in its normal lower position. This normal position of the pin is in line with the pin 245 and the valve slide 161, which it engages during the upward movement of the spindle carrier for thereby upwardly shifting the slide 161, as seen in Fig. 22.

This upward movement of the valve slide 161, through its rack teeth 165, oscillates the arm 167 for shifting the valve stem 170 of valve mechanism 172. The valve mechanism 172, as noted above, is shown diagrammatically in Fig. 24 and structurally in Fig. 13, and is substantially identical with the valve mechanism 171. The valve stem 170, therefore, has connected therewith a valve member 254 having intermediate its ends a reduced portion or cannelure 255. Below the cannelure 255, the valve stem 254 is provided with a counterbore in which is set one end of a coil spring 256, which has its other end seated in the counterbore of a plug 257 in the end of the bore in the valve block 92 which accommodates the valve 254. The valve member 254 is provided with a flange 258 to engage a shoulder 259 to limit the movement thereof by the spring 256.

As shown in Fig. 24, the reduced portion or canelure 255 normally connects ports 260 and 261, and when operated by the arm 167, connects the ports 261 and 262. The ports 262 have connected therewith one end of a branch pressure pipe or conduit 263, while the ports 260 have connected therewith one end of a pipe or conduit 264, which terminate in the sump or tank 68. The remaining ports 261 have connected therewith one end of a pipe or conduit 265, terminating at its other end in a cylinder 266. While the connection between the ports of the valve mechanism 172 is illustrated, in Fig. 24, as pipes or conduits, they are in fact merely cross-drilled ports in the valve block 92.

The cylinder 266 is in effect a cylindrical bore in valve block 92, which has disposed therein a piston 267, engaging the undersurface of the valve shifter arm 104. The operation of the pitson 267 shifts the main control valve 85 to its extreme left hand position, thereby connecting the pressure in the pipe or conduit 95 and the top of the cylinder 57 for actuating the piston 56 therein downwardly at a rapid rate. The fluid ahead of the piston 56 is forced through the pipe or conduit 96, to the main control valve 85, where it is connected with the pipes or conduits 97 and 98 and the sump or tank 68, thereby rapidly advancing the tool to the work.

From the foregoing, it will now be noted that the dog 244, through its pin 245 and the intermediate pin 246, reverses the movement of the tool carrier. It should be noted at this time that this reversal took place at a point short of the initial position of the tool carrier, and from which initial position the carrier was actuated by the manual operation of the lever 101. It should also be noted that the frictional connection of the cumulative stop dog 111 causes the feed dog to move upwardly with the carrier and is therefore now positioned on the dog rod or bar 110 at a point where the previous slow movement or drilling of the work stopped.

During this upward movement of the carrier, a cam plate 268, carried by the tool head and having a cam 269 thereon, engages a lug or knob 270 on the feed latch 151 for actuating same about its pivotal connection 153 and disengaging the nose 157 from the rack teeth 158. Upon the disconnection of the feed dog 146 from the dog bar 110, the spring 158, compressed during the previous slow feed movement of the carrier, expands for separating the cumulative and feed dogs an amount determined by the conecting pin or bolt 159 and again positioning the feed dog to permit its subsequent operation. It will be appreciated of course, that this feed dog may not have operated to reverse the carrier, which may have been accomplished by the governor controlled mechanism, but, nevertheless, the feed dog was actuated toward the cumulative stop dog whose movement was arrested by engaging the top face or surface 271 of the bracket 164 immediately after the operation of the flipper 118.

The rapid downward movement of the carrier, and parts carried thereby, continues until the cumulative stop dog, through its cam 117 again shifts the flipper 118 for slowing down the movement of the carrier to a feeding rate. The feed then continues until the drilling distance, as established by the spacing of the dog screw nose 149 from the cumulative stop dog 111, has taken place, or until the torque on the drill reaches the point for substantially slowing down the rotation of the governor spindle, so that its switch 210—213 closes, whereupon the carrier is reversed to retract the tool from the work and effect a clearing of the chips from the hole being bored.

This cycle of operation is repeated continuously until the hole is completely bored through, whereupon the parts are returned to their initial position and the movement of the tool carrier stopped.

This mechanism for returning the carrier to its initial position, and stopping the mechanism, comprises a cam dog 272, see Fig. 1, which has a cam face 273 and is adjustably positioned in the T-slot 107 in the carrier. This dog 272 is adjusted to the point where it comes into operation after the work has been completely bored, and is adapted to engage the end 274, see Fig. 21, of a short rack 275 mounted for transverse movement in the bracket 164. The rack 275 has its teeth 276 meshed with a pinion 277, keyed or otherwise secured to the rod 249, which, as noted above, carries at its lower end the arm 248. This rod 249, in addition, has secured thereto a resetting member 278, see Figs. 8 and 19, having a lug 279 adapted to overlie a lug 280 projecting from the side of the cumulative stop dog 111.

Figure 21:
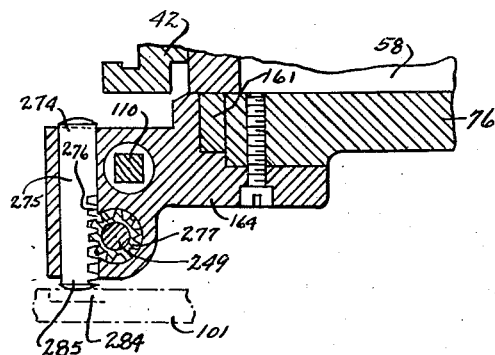
Fig. 21 is an enlarged fragmentary, horizontal, sectional view, taken on line 21—21 on Fig. 8.

When the tool of the carrier has completely bored the hole being drilled, the cam dog 272 shifts the rack 275 outwardly, as seen in Fig. 21, or to the right, as seen in Fig. 1, thereby oscillating the rod 249. This oscillation of the rod 249 carries with it the arm 248 and removes the intermediate pin 246, carried by its outer end, from the path of movement of the dog pin 245, so that the upward movement of the cam slide 161 cannot be effected. This then permits the carrier to travel beyond the point where it is normally reversed by the dog 244. In order to stop the carrier at its upper limit of movement, it has projecting from it, see Fig. 22, a pin 281, which engages the projecting end 282 of an arm 283 keyed or otherwise secured to the inner end of the flipper dog stud or shaft 119, as seen in Fig. 18. This stud or flipper dog shaft 119 is connected, through the seat and lug 120 and 121, with the lever 101, and therefore the valve member 85, for shifting the valve to its stop or neutral position. In order to initiate further operation of the machine, it is necessary to shift the valve to position by the lever 101.

The oscillation of the rod 249, as above described, also shifts the resetting member 278 to the position to cause the projection 279 to overlie the cumulative stop dog lug 280 and thereby hold the said dog relative to the dog bar 110 during this final upward movement of the carrier, and thereby positioning the cumulative dog to its initial position for a subsequent operation of the machine. The positioning of the cumulative stop dog through its connection or pin 159, correspondingly positions the feed dog 146 on the dog bar. The operation of the handle or lever 101, for starting up the machine, effects the oscillation of the rod 249, so as to free the cumulative stop dog from its resetting member 278, as well as to position the pin 246, for subsequently reversing the direction of movement of the tool carrier. This resetting of the parts takes place through a cam 284, on the lever 101, which engages the end 285 of the rack 275 for shifting it in a direction reverse to that in which it was shifted by the cam dog 272.

In order to hold the rod 249 in either of its two operative positions, it has keyed or otherwise secured to it, at a point below the bracket 164, a detent plate 286, provided in its one end with a pair of notches 287 and 288, which co-operate with a spring pressed detent 289. The detent member 289, is disposed in an enlarged bored portion 290 of the bracket 164 which contains a spring 291 abutting on its inner end with the detent 289, and on its outer end with a plug 292.

From the foregoing, it will now be appreciated that there has been provided a deep hole or step drilling machine, in which the tool is actuated through repeated cycles of a rapid movement toward the work, a slow movement through a portion of the work and a rapid movement from the work. The control of this cycle is dependent largely on the torque on the drill or tool during its operation, which control may be supplemented by means for periodically clearing the hole of chips to insure accuracy in drilling, and ultimate safety of the drill. It will be appreciated that the idle time of machines as heretofore known and used has been greatly reduced, while the mechanism is held to ultimate simplicity when considering the necessarily involved circuit.

What is claimed is:

1. In a drilling machine of the class described, the combination of a tool carrier, means for rotating the tool, means for reversely actuating the carrier and tool relative to the work, a speed control governor connected with the tool to have imparted thereto the rotations of the tool, and means operable by said governor upon slowing down in rotation of the tool for reversing the direction of movement of the tool relative to the work.

2. In a drilling machine of the class described, the combination of a tool carrier for rotatably supporting a drill or other tool, a governor connected with said tool for having the rotations of the tool imparted thereto, means for actuating the tool carrier and tool toward the work while the tool is rotating, a control member associated with said tool carrier actuating means for reversing the said actuating means, means for shifting the control member to a position to cause the tool carrier to move toward the work, and means operable by the slowing down of the governor for actuating the control member to a position for withdrawing the tool from the work.

3. In a drilling machine of the class described, the combination of a tool carrier for rotatably supporting a drill or other tool, a governor connected with said tool for having the rotations of the tool imparted thereto, means for actuating the tool carrier and tool toward the work while the tool is rotating, a control member associated with said tool carrier actuating means for reversing the said actuating means, means for shifting the control member to a position to cause the tool carrier to move toward the work, and means operable by the slowing down of the governor for actuating the control member to a position for withdrawing the tool from the work, and additional means associated with the tool carrier for actuating the control member to a position for withdrawing the tool from the work.

4. In a drilling machine of the class described, the combination of a tool carrier, a tool spindle rotatably mounted on the carrier, a hydraulic piston and cylinder mechanism for actuating the tool carrier toward and from the work, a hydraulic circuit for effecting the operation of the piston and cylinder mechanism and including a multi-position control valve, a speed controlling governor connected with the spindle to have imparted to it the rotations of the tool spindle, means for shifting the control valve to a position for actuating the tool carrier toward the work, and means operable by the governor for shifting the control valve upon slowing down of the tool spindle to a point for retracting the tool carrier from the work.

5. In a drilling machine of the class described, the combination of a tool carrier, a tool spindle rotatably mounted on the carrier, a hydraulic piston and cylinder mechanism for actuating the tool carrier toward and from the work, a hydraulic circuit for effecting the operation of the piston and cylinder mechanism and including a multi-position control valve, a speed controlling governor connected with the spindle to have imparted to it the rotations of the tool spindle, means for shifting the control valve to a position for actuating the tool carrier toward the work, means operable by the governor for shifting the control valve upon slowing down of the tool spindle to a point for retracting the tool carrier from the work, said tool carrier having a definite stroke length and means operable intermediate the ends of the carrier stroke length for shifting the control valve to its position for retracting the tool carrier from the work.

6. In a drilling machine of the class described, the combination of a tool carrier mounted for reciprocating movement toward and from a work piece, a tool spindle rotatably supported by the tool carrier, means for rotating the spindle and a tool carried thereby, a piston and cylinder mechanism one of which is movable and connected with the carrier for effecting its reciprocation in reversed directions a hydraulic circuit for effecting and controlling the operation of the movable member of the piston and cylinder mechanism including a control valve, manual means for shifting the control valve to a position for actuating the tool carrier toward the work, electro-magnetic means for shifting the valve to a position for actuating the tool carrier from the work, and a control switch for said electro-magnetic valve shifting means operable upon decrease in rotation of the tool spindle and tool carried thereby.

7. In a drilling machine of the class described, the combination of a tool carrier mounted for reciprocating movement toward and from a work piece, a tool spindle rotatably supported by the tool carrier, means for rotating the spindle and a tool carried thereby, a piston and cylinder mechanism one of which is movable and connected with the carrier for effecting its reciprocation in reversed directions, a hydraulic circuit for effecting and controlling the operation of the movable member of the piston and cylinder mechanism including a control valve, manual means for shifting the control valve to a position for actuating the tool carrier toward the work, electro-magnetic means for shifting the valve to a position for actuating the tool carrier from the work, and a control switch for said electro-magnetic valve shifting means operable upon decrease in rotation of the tool spindle and tool carried thereby, and including a governor connected with the spindle and having imparted thereto the rotations of the spindle.

8. In a drilling machine of the class described, the combination of a tool carrier mounted for reciprocating movement toward and from a work piece, a tool spindle rotatably supported by the tool carrier, means for rotating the spindle and a tool carried thereby, a piston and cylinder mechanism one of which is movable and connected with the carrier for effecting its reciprocation in reversed directions, a hydraulic circuit for effecting and controlling the operation of the movable member of the piston and cylinder mechanism including a control valve, manual means for shifting the control valve to a position for actuating the tool carrier toward the work, electromagnetic means for shifting the valve to a position for actuating the tool carrier from the work, and a control switch for said electro-magnetic valve shifting means operable upon decrease in rotation of the tool spindle and tool carried thereby, and additional means for shifting the control valve to a position for actuating the tool carrier from the work.

9. In a drilling machine of the class described, the combination of a tool carrier, a tool spindle mounted for rotation in the carrier, a belt drive for effecting the rotation of the spindle, means for tensioning the belt to a point below the safe torque limit of the tool, means for actuating the tool carrier toward a work piece during the rotation of the tool including a control member, a governor connected with the tool spindle to have imparted thereto the rotation of the tool spindle, and means operable upon slowing down of the governor for actuating the control member to reverse the direction of movement of the tool carrier when the torque on the tool exceeds the established driving tension on the belt.

10. In a drilling machine of the class described, the combination of a tool carrier, a tool spindle mounted for rotation in the carrier, a belt drive for effecting the rotation of the spindle, means for tensioning the belt to a point below the safe torque limit of the tool, means for actuating the tool carrier toward a work piece during the rotation of the tool including a control member, a governor connected with the tool spindle to have imparted thereto the rotation of the tool spindle, and means operable upon slowing down of the governor for actuating the control member to reverse the direction of movement of the tool carrier when the torque on the tool exceeds the established driving tension on the belt, said governor operated means including a switch operated thereby and controlling an electro-magnetic control member actuator.

11. In a drilling machine of the class described, the combination of a tool spindle, means for supporting said tool spindle for translation toward and from a work piece, means including a friction clutch for rotating the spindle during its translation, means for establishing the slipping point of the friction clutch just below the critical torque breaking point of the drill, a control member for reversing the translation of the tool carrier, a governor connected with the spindle beyond the friction clutch, and means operable by said governor for actuating the control member of the translating means when the torque reaches the critical safety torque point of the drill.

12. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor operatively connected with the spindle to have imparted thereto the rotations of the spindle, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, and means for shifting the valve to its position for causing the translation of the carrier toward the work.

13. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor operatively connected with the spindle to have imparted thereto the rotations of the spindle, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, and means for shifting the valve to its position for causing the translation of the carrier toward the work, said governor operable means including a switch operated by the governor and connected with electro-magnetic valve shifting means.

14. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor adjacent the spindle, a direct belt connection between the spindle and governor whereby the rotations of the spindle are imparted to the governor, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, and means for shifting the valve to its position for causing the translation of the carrier toward the work, said governor operable means including a switch operated by the governor and connected with electro-magnetic valve shifting means.

15. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor adjacent the spindle, a direct gear connection between the spindle and governor whereby the rotations of the spindle are imparted to the governor, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, and means for shifting the valve to its position for causing the translation of the carrier toward the work, said governor operable means including a switch operated by the governor and connected with electro-magnetic valve shifting means.

16. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor operatively connected with the spindle to have imparted thereto the rotations of the spindle, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, means for shifting the valve to its position for causing the translation of the carrier toward the work, and means associated with the carrier for shifting the valve to a position for translating the carrier away from the work.

17. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor operatively connected with the spindle to have imparted thereto the rotations of the spindle, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, means for shifting the valve to its position for causing the translation of the carrier toward the work, and means associated with the carrier for shifting the valve to a position for stopping the translation of the carrier.

18. In a step drilling machine of the class described, the combination of a tool spindle, a translatable carrier for said spindle, means for rotating the spindle during its translation, a hydraulically actuated piston for translating the carrier and spindle, a multi-position control valve for controlling the rate and direction of translation of the carrier, means for shifting the valve to effect a rapid translation of the carrier toward the work, cumulative stop means associated with the carrier for shifting the valve to change the rate of translation of the carrier, a governor operatively connected with the spindle to have imparted thereto the rotations of the spindle, means associated with the spindle rotating means for determining the ultimate effective torque on the spindle which is at a point below the torque breaking point of the drill, means operable by the governor upon slowing down of the spindle effected by the torque on the drill reaching the point of torque adjustment on the spindle driving means for shifting the valve to a position for translating the carrier away from the work, means for shifting the valve to its position for causing the translation of the carrier toward the work, means associated with the carrier for shifting the valve to a position for translating the carrier away from the work, and means associated with the carrier for shifting the valve to a position for stopping the translation of the carrier.

19. In a step drilling machine of the class described, the combination of a spindle, means for rotating the spindle, means for establishing the effective driving torque in said spindle rotating means, a translatable carrier rotatably supporting the spindle during its translation, a hydraulically actuated piston connected with the carrier for effecting its translation, and a hydraulic circuit and control means therefor for actuating the piston and carrier through a plurality of cycles toward and from a work piece, each cycle including a rapid movement of the carrier toward the work, a slow feed movement into the work, and a rapid movement from the work, including a multi-position valve, means for shifting the valve to a position for rapidly advancing the carrier toward the work, a dog on the carrier for positioning the valve to actuate the carrier at a slow rate toward the work, a speed operated governor connected with the spindle to have imparted thereto the rotations of the spindle, means operated by the governor upon slowing down thereof due to the torque on the drill exceeding the effective driving torque of the spindle driving means for positioning the valve to actuate the carrier at a rapid rate from the work, dog means on the carrier for positioning the valve to actuate the carrier at a rapid rate from the work, dog means on the carrier for positioning the valve for rapidly advancing the carrier toward the work, and means for positioning the valve to stop further translation of the carrier.

GEORGE K. McKEE.